(12) United States Patent
Youm et al.

(10) Patent No.: US 8,347,116 B2
(45) Date of Patent: Jan. 1, 2013

(54) SEMICONDUCTOR DEVICE HAVING MULTI ACCESS LEVEL AND ACCESS CONTROL METHOD THEREOF

(75) Inventors: Yun-Ho Youm, Seoul (KR); Heonsoo Lee, Seoul (KR); Mijung Noh, Yongin-si (KR); Jaechul Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 396 days.

(21) Appl. No.: 12/796,110

(22) Filed: Jun. 8, 2010

(65) Prior Publication Data

US 2010/0332783 A1 Dec. 30, 2010

(30) Foreign Application Priority Data

Jun. 25, 2009 (KR) .................. 10-2009-0057179

(51) Int. Cl.
*G06F 12/14* (2006.01)
*G06F 12/00* (2006.01)
(52) U.S. Cl. ........ 713/193; 713/182; 713/183; 713/184; 713/185; 713/189; 726/5; 726/7; 711/164; 711/173; 711/E12.001
(58) Field of Classification Search .......... 713/182–185, 713/189, 193; 726/5, 7; 711/164, 173, 170, 711/E12.001
See application file for complete search history.

(56) References Cited

U.S. PATENT DOCUMENTS

| | | | | |
|---|---|---|---|---|
| 6,230,231 | B1 * | 5/2001 | DeLong et al. | 711/3 |
| 7,290,084 | B2 * | 10/2007 | Miller et al. | 711/108 |
| 7,539,877 | B2 | 5/2009 | Miyata et al. | |
| 2002/0147918 | A1 | 10/2002 | Osthoff et al. | |
| 2005/0065943 | A1 * | 3/2005 | Miyata et al. | 707/100 |
| 2006/0288231 | A1 | 12/2006 | Kim et al. | |
| 2008/0082828 | A1 | 4/2008 | Jennings et al. | |
| 2008/0235772 | A1 * | 9/2008 | Janzen | 726/5 |
| 2009/0144559 | A1 * | 6/2009 | Lee et al. | 713/189 |
| 2009/0193263 | A1 * | 7/2009 | Gnech et al. | 713/183 |
| 2009/0228711 | A1 * | 9/2009 | Lim | 713/182 |
| 2010/0185870 | A1 * | 7/2010 | Rane et al. | 713/184 |

FOREIGN PATENT DOCUMENTS

| | | |
|---|---|---|
| JP | 2005-32130 | 2/2005 |
| KR | 10-2006-0133760 | 12/2006 |

OTHER PUBLICATIONS

Cungang Yang, Celia Li, Access control in a hierarchy using one-way hash functions, Ryerson University, Toronto, Ontario, Canada, Computers & Security (2004) 23, 659-664.*
K Ren, W Lou, K Kim, R Deng, A novel privacy preserving authentication and access control scheme for pervasive computing environments, Vehicular Technology, IEEE Transactions,vol. 55, No. 4, Jul. 2006.*

* cited by examiner

*Primary Examiner* — David Pearson
*Assistant Examiner* — Amir Mehrmanesh
(74) *Attorney, Agent, or Firm* — Onello & Mello, LLP

(57) ABSTRACT

An access control method of a semiconductor device includes providing an inputted password as an input of a hash operator; performing a hash operation in the hash operator and outputting a first hash value; controlling the hash operator so that the hash operation is repeatedly performed in the hash operator by providing the first hash value as an input of the hash operator when the first hash value and a second hash value stored in a nonvolatile memory do not coincide; and setting an access level with respect to the inner circuit according to the repetition number of times of the hash operation of the hash operator when the first and second hash values coincide.

10 Claims, 7 Drawing Sheets

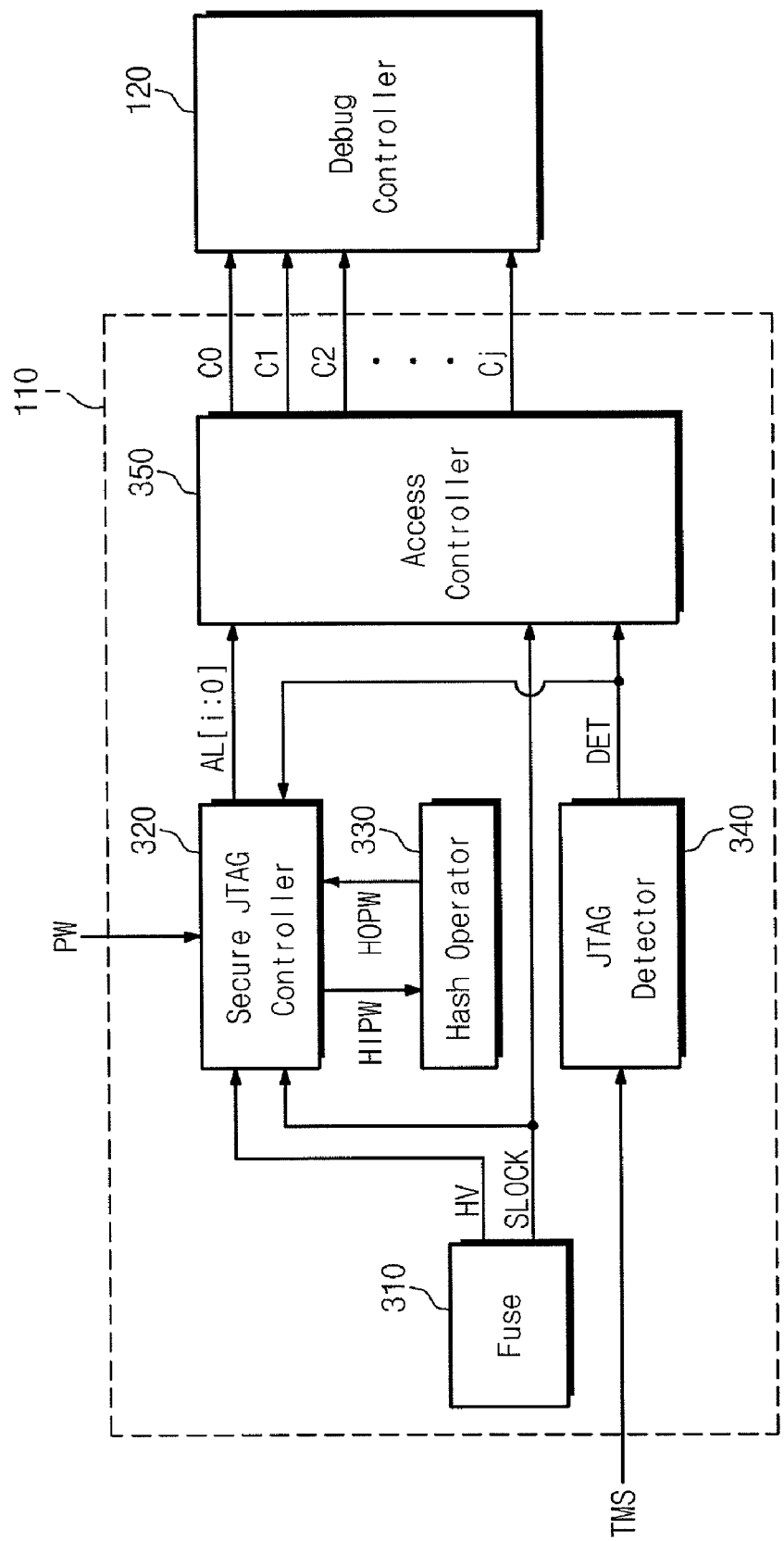

Fig. 6

| User | Access level | A[2:0] | C0 | C1 | C2 | C3 |
|---|---|---|---|---|---|---|
| SL4 | 4 | 100 | 1 | 1 | 1 | 1 |
| SL3 | 3 | 011 | 0 | 1 | 1 | 1 |
| SL2 | 2 | 010 | 0 | 1 | 0 | 1 |
| SL1 | 1 | 001 | 0 | 0 | 0 | 1 |
| × | 0 | 000 | 0 | 0 | 0 | 0 |

SEMICONDUCTOR DEVICE HAVING MULTI ACCESS LEVEL AND ACCESS CONTROL METHOD THEREOF

CROSS-REFERENCE TO RELATED APPLICATIONS

This U.S. non-provisional patent application claims priority under 35 U.S.C. §119 of Korean Patent Application No. 10-2009-0057179, filed in the Korean Intellectual Property Office on Jun. 25, 2009, the entire contents of which are hereby incorporated by reference.

BACKGROUND OF THE INVENTIVE CONCEPT

The present inventive concept relates to a semiconductor device, and more particularly, to a semiconductor device having a multi access level which can restrict an access range according to an inputted password, and an access control method thereof.

As the semiconductor industry develops, semiconductor devices, for example, various electronic devices using semiconductor chips, are being developed. According to a type of an electronic device, data requiring security such as personal information, financial information, etc., may be stored in a semiconductor chip. Also, a semiconductor chip built in an electronic device can store program codes to control every operation of the electronic device. Therefore, access to a semiconductor chip built in an electronic device has to be restrictively permitted.

A semiconductor chip built in an electronic device may include a JTAG (joint test action group) interface for test or debugging. A test or debugging of a semiconductor chip through the JTAG interface is performed by an authorized user to protect data stored in a semiconductor device. Thus, an approach which can restrict access to a semiconductor chip through the JTAG interface is required.

As semiconductor chips have become smaller, and devices and conductors on the chips have become finer and more complex, a system on chip (SOC) has been introduced. Generally, SOC includes all the hardware and software constituting an integration circuit, such as a processor, a memory, an external interface, an analog and mixed mode block, built-in software and an operating system (OS). The data stored in a memory included in a SOC may be program code for operating an electronic device, application program code, personal information and/or financial information. For instance, an application programmer has to be allowed to access an application program stored in a memory to debug the application program but has to be restricted to access program code for driving an electronic device. Thus, a method which can restrict access to a semiconductor chip depending on a user is needed.

SUMMARY OF THE INVENTIVE CONCEPT

According to one aspect, the inventive concept is directed to a method of controlling access to an inner circuit in an interface circuit of a semiconductor device which includes the interface circuit and the inner circuit. The method includes: providing an inputted password as an input of a hash operator; performing a hash operation in the hash operator and outputting a first hash value; controlling the hash operator so that the hash operation is repeatedly performed in the hash operator by providing the first hash value as an input of the hash operator when the first hash value and a second hash value stored in a nonvolatile memory do not coincide; and setting an access level with respect to the inner circuit according to the repetition number of times of the hash operation of the hash operator when the first and second hash values coincide.

In one embodiment, the method further includes, if the first and second hash values do not coincide while the hash operator repeatedly performs the hash operation the predetermined number of n times, prohibiting access to the inner circuit.

In one embodiment, setting an access level sets the access level with respect to the inner circuit at a highest level if the repetition number of times of the hash operation of the hash operator is n when the first and second hash values coincide and sets the access level with respect to the inner circuit at a level corresponding to K if the repetition number of times of the hash operation of the hash operator is k (k is a positive integer greater than n) when the first and second hash values coincide In one embodiment, the inner circuit comprises a memory including a plurality of memory regions and wherein setting an access level comprises setting a region which can be accessed among the plurality of memory regions of the memory according to the number of times of the hash operation of the hash operator when the first and second hash values coincide.

In one embodiment, the access level with respect to the inner circuit comprises a phased plurality of access levels and a high access level can access a memory region which can be accessed by a low access level.

In one embodiment, the nonvolatile memory storing the second hash value is an E-fuse memory.

In one embodiment, the interface circuit comprises a joint test action group (JTAG) interface.

According to another aspect, the inventive concept is directed to a semiconductor device comprising: an inner circuit; a hash operator performing a hash operation with respect to an input and outputting a first hash value; and a secure controller providing passwords inputted from the outside as an input of the hash operator and setting an access level with respect to the inner circuit according to the repetition number of times of the hash operation when a first hash value outputted from the hash operator and the second hash value stored in the nonvolatile memory coincide. The secure controller controls the hash operator so that the hash operation is repeatedly performed in the hash operator by providing the first hash value as an input of the hash operator when the first and second hash values coincide.

In one embodiment, the secure controller provides the first hash value outputted from the hash operator as an input of the hash operator repeatedly the maximum number of n (n is a positive integer) times, sets an access level with respect to the inner circuit at the highest access level if the repetition number of times of the hash operation of the hash operator is n when the first and second hash values coincide, and sets an access level with respect to the inner circuit at a level corresponding to k if the repetition number of times of the hash operation of the hash operator is the k (k is a positive integer smaller than the n) when the first and second hash values coincide.

In one embodiment, the second hash value stored in the nonvolatile memory is a hash value obtained by performing a hash operation on a password set by a user having the highest access level repeatedly the number of n times.

BRIEF DESCRIPTION OF THE DRAWINGS

The foregoing and other features and advantages of the inventive concept will be apparent from the more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept.

FIG. 3 is a schematic block diagram illustrating a specific construction of a JTAG interface illustrated in FIG. 1, in accordance with an embodiment of the present inventive concept.

FIG. 6 is a schematic diagram illustrating control signals outputted from an access controller illustrated in FIG. 3 by example according to an access level of a user, in accordance with an embodiment of the present inventive concept.

DETAILED DESCRIPTION OF THE EMBODIMENTS

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this description will be thorough and complete, and will fully convey the inventive concept to those skilled in the art. Like numbers refer to like elements throughout.

Figure 1:
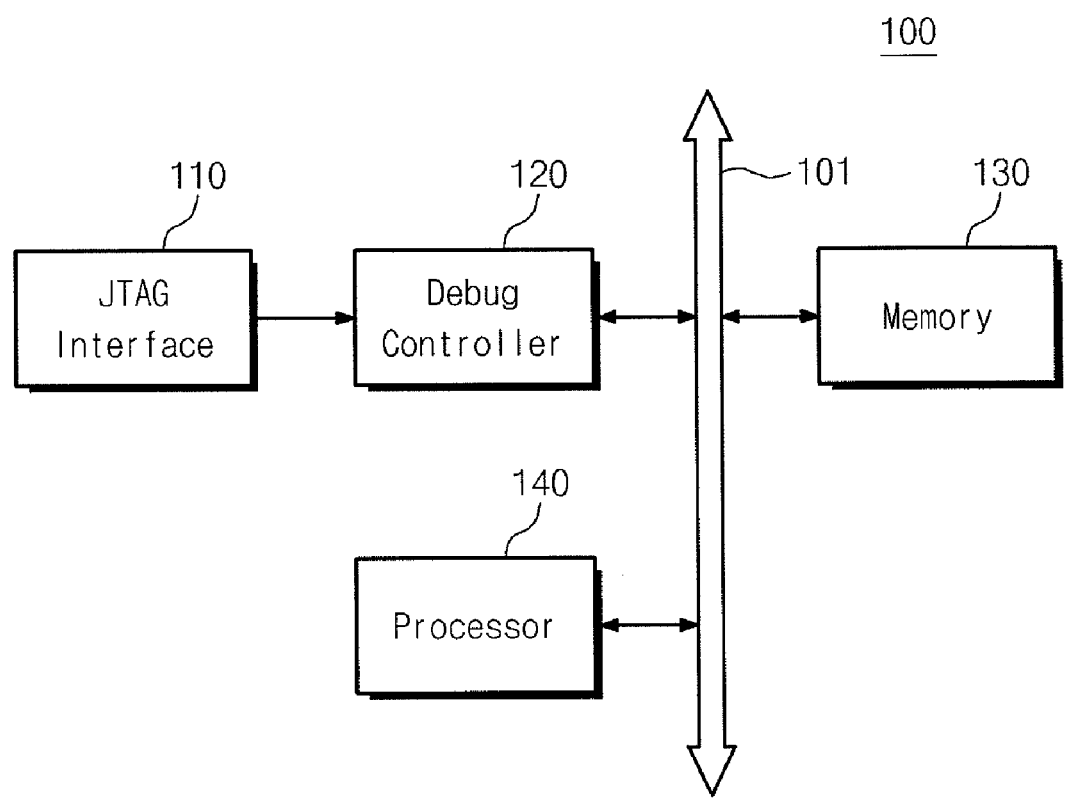
FIG. 1 is a schematic block diagram illustrating a semiconductor device in accordance with an embodiment of the present inventive concept.

FIG. 1 is a drawing illustrating a semiconductor device in accordance with an embodiment of the present inventive concept.

Referring to FIG. 1, a semiconductor device 100 includes a JTAG (joint test action group) interface 110, a debug controller 120, a memory 130 and a processor 140. The debug controller 120, the memory 130 and the processor 140 are connected to one another through a bus 101. Block circuits having various functions besides the debug controller 120, the memory 130 and the processor 140 may be further included on the bus 101.

The JTAG interface 110 is a signal input/output port for performing test and debug on the semiconductor device 100 and follows a JTAG standard. The semiconductor device 100 including the JTAG interface 110 can operate according to the JTAG standard inputted from the outside. Therefore, hardware debugging can be performed on the semiconductor device 100 without separate expensive equipment.

The JTAG interface 110 of the present inventive concept sets up an access level with respect to the memory 130 according to a password inputted from the outside. The debug controller 120 controls access with respect to the memory 130 in response to a signal outputted from the JTAG interface 110.

In this embodiment, the JTAG interface 110 is included in the semiconductor device 100 by example, but a data input/output interface is not limited to the JTAG interface 110 and can be variously changed.

Figure 2:
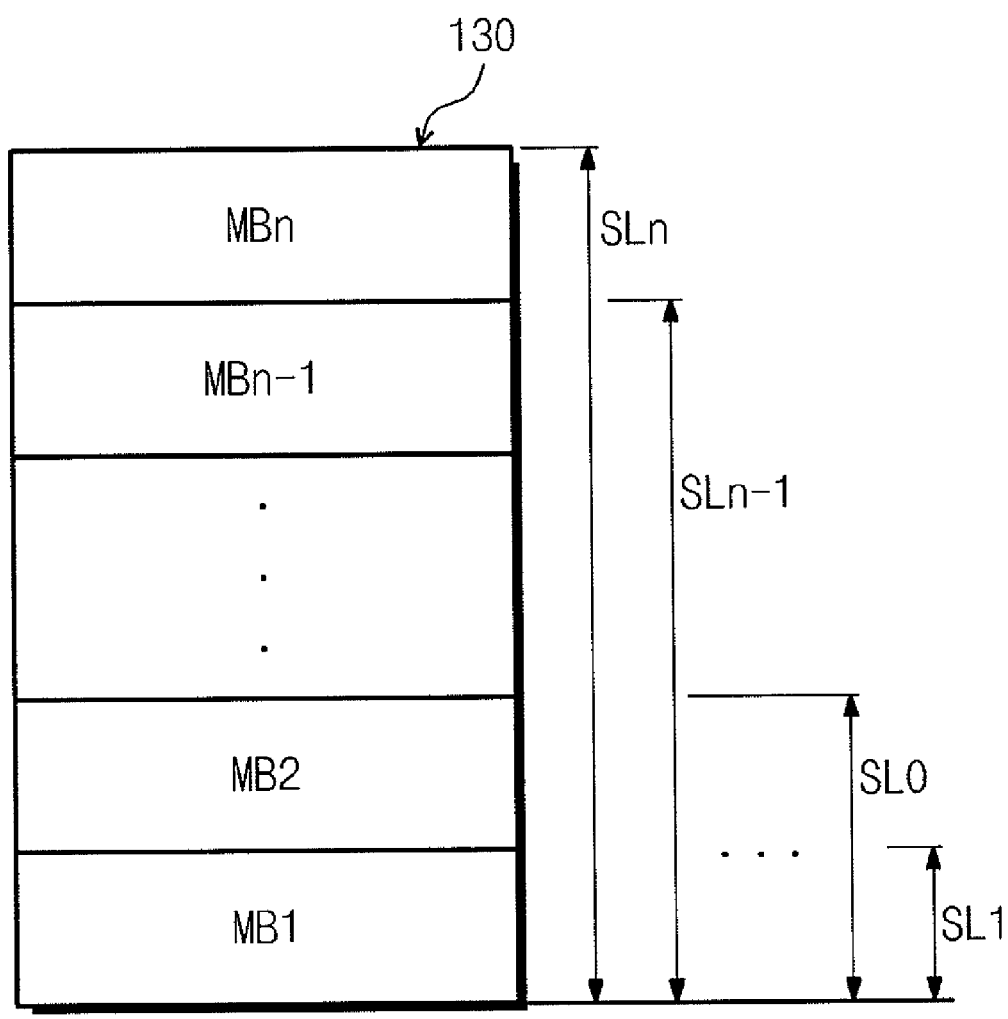
FIG. 2 is a schematic diagram illustrating a memory illustrated in FIG. 1, in accordance with an embodiment of the present inventive concept.

FIG. 2 is a drawing illustrating the memory 130 illustrated in FIG. 1.

Referring to FIG. 2, the memory 130 includes a plurality of memory regions (MB1, MB2, . . . , MBn). The memory 130 can store various program codes and data such as a program code, an application program code, user data and a multi media file for the operation of the semiconductor device 100. The memory 130 may be a nonvolatile memory, such as a flash memory, EEPROM, FeRAM, MRAM, PRAM, RRAM, ROM, a hard disc, a light disc drive or the like.

In this embodiment, each of the memory regions (MB1, MB2, . . . , MBn) can be accessed by various users (SL1, SL2, . . . , SLn) having different access levels from one another. For example, the memory region (MB1) can be accessed by all the users (SL1, SL2, . . . , SLn) who pass a password certification. The memory region (MB2) can be accessed by the remaining users (SL2, . . . , SLn) except the user (SL1). The memory region (MBn) can be accessed by only the user (SLn) having the highest access level. The users (SL1, SL2, . . . , SLn) having a phased access level receive different passwords and can be authorized to access to the memory regions (MB1, MB2, . . . , MBn) by inputting the received password.

Access limitation to the memory 130 can be different within the memory 130. For example, the memory 130 is divided into various memory regions (MB1~MBn) according to a physical address, and access to a specific address of the memory 130 can be restricted according to the established access level.

FIG. 3 is a drawing illustrating a specific construction of a JTAG interface illustrated in FIG. 1.

Referring to FIG. 3, the JTAG interface 110 includes a nonvolatile memory 310, a secure JTAG controller 320, a hash operator 330, a JTAG detector 340 and an access controller 350. The JTAG detector 340 detects a mode signal (TMS) inputted from the outside and outputs a detection signal (DET). When the JTAG detector 340 detects the mode signal (TMS) inputted from the outside, it provides the activated detection signal (DET) to the secure JTAG controller 320 and the access controller 350. A signal inputted into the JTAG interface 110 from the outside may further include a cluck signal in accordance with a JTAG standard, a reset signal (TSRT) and a data input signal (TDI) besides the mode signal (TMS).

The nonvolatile memory 310 stores a hash value with respect to a password. In this embodiment, the nonvolatile memory 310 is constituted by an electrically programmable E-fuse. The nonvolatile memory 310 can further store a soft lock signal (SLOCK) representing whether a password test is performed or not.

If the soft lock signal (SLOCK) outputted from the fuse 310 is low level, the secure JTAG controller 320 does not perform a secure control function. That is, while the soft lock signal (SLOCK) outputted from the fuse 310 is low level, the secure JTAG controller 320 outputs an access level signal (AL[i:0]) so that an access to all the regions of the memory 130 is allowed.

If the soft lock signal (SLOCK) outputted from the fuse 310 is high level, the secure JTAG controller 320 outputs an access level signal (AL[i:0]) in response to a password (PW) inputted from the outside. The password (PW) can be inputted through a data input pin in accordance with the JTAG standard. The secure JTAG controller 320 provides the inputted password (PW) as an input (HIPW) of the hash operator 330.

The hash operator 330 calculates a hash value with respect to the input (HIPW) and then outputs the calculated hash value (HOPW). The hash operator 330 calculates the hash value by any one of hash functions such as MD5 and SHA or the like.

The secure JTAG controller 320 compares a hash value (HV) stored in the fuse 310 with the hash value (HOPW) calculated by the hash operator 330. If the hash value (HV) stored in the fuse 310 and the hash value (HOPW) calculated by the hash operator 330 do not coincide, the secure JTAG controller 320 provides the hash value (HOPW) outputted from the hash operator 330 as an input (HIPW) of the hash operator again. The hash operator 330 repeatedly performs a hash operation according to a control of the secure JTAG controller 320. If the hash value (HV) stored in the fuse 310 and the hash value (HOPW) calculated by the hash operator 330 coincide, the secure JTAG controller 320 outputs an access level signal (AL[i:0]) according to the repetition number of the hash operation of the hash operator 330. The secure JTAG controller 320 may include a counter to count the repetition number of a hash operation. The access level signal (AL[i:0]) is further described in detail below.

If the soft lock signal (SLOCK) is low level after the detection signal (DET) outputted from the JTAG detector 340 is activated, the access controller 350 outputs a plurality of control signals (C0~Cj) so that all the memory regions of the memory 130 are allowed to be accessed regardless of the access level signal (AL[i:0]). If the soft lock signal (SLOCK) is a high level after the detection signal (DET) outputted from the JTAG detector 340 is activated, the access controller 350 outputs a plurality of control signals (C0~Cj) in response to the access level signal (AL[i:0]) received from the secure JTAG controller 320.

Figure 4A:
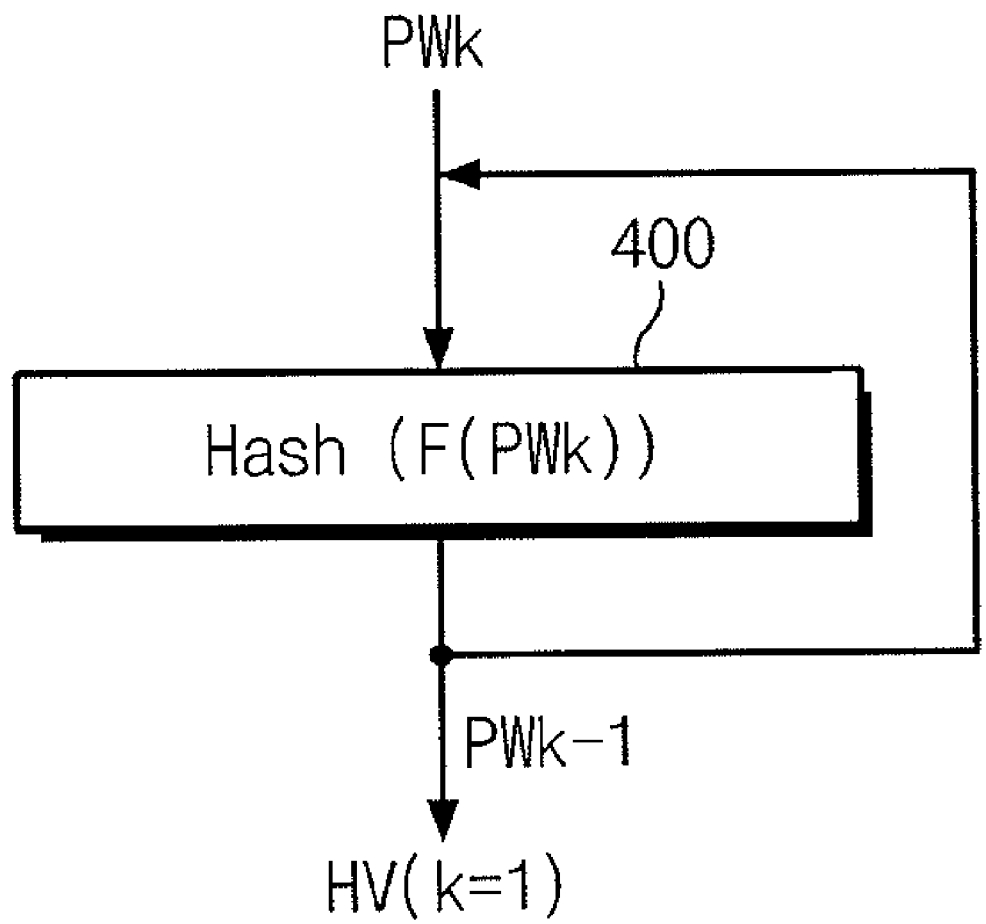
FIG. 4A is a schematic diagram illustrating a hash operator calculating a hash value stored in a fuse illustrated in FIG. 3, in accordance with an embodiment of the present inventive concept.
Figure 4B:
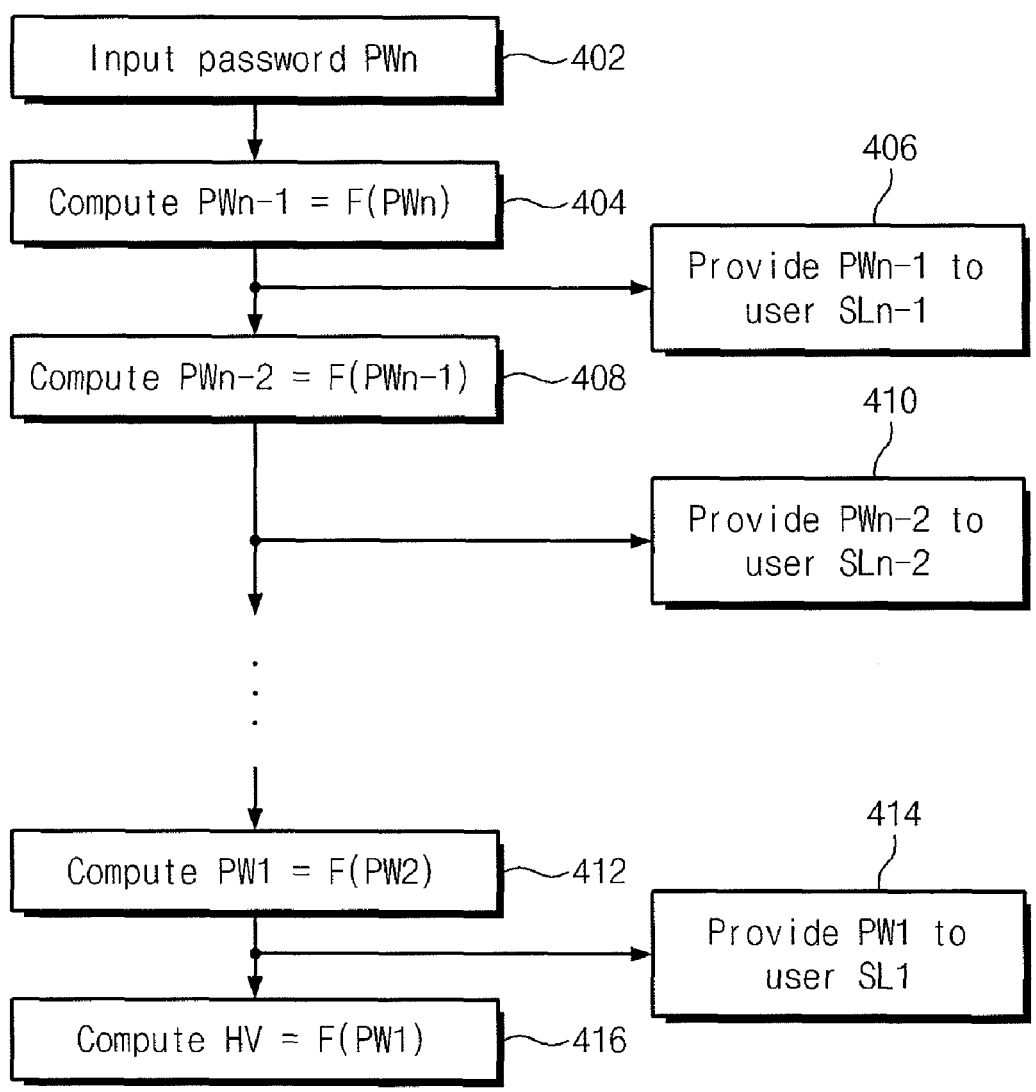
FIG. 4B is a flow chart illustrating a process of calculating a hash value using the hash operator illustrated in FIG. 4A, in accordance with an embodiment of the present inventive concept.

FIG. 4A is a drawing illustrating a hash operator calculating a hash value stored in the fuse 310 illustrated in FIG. 3. FIG. 4B is a flow chart illustrating a process for calculating a hash value (HV) using the hash operator 400 illustrated in FIG. 4A.

Referring to FIG. 4A, the hash operator 400 receives a predetermined password (PWk, k is a positive integer) set by a user and then outputs a hash value (PWk-1) according to a hash function calculation. The hash operator 400 repeatedly calculates a hash value and a hash value (PW0) outputted from the hash operator 400 is selected as a hash value to be stored in the fuse 310 when k is 1.

Referring to FIG. 4B, if the user (SLn) having the highest access level (n) sets an arbitrary password (PWn), the hash operator 400 illustrated in FIG. 4A receives the password (PWn) (402). The hash operator 400 calculates a hash value (F(PWn)) 404. A hash value (PWn-1) outputted from the hash operator 400 is provided to a user (SLn-1) having an access level of n-1 as a password (406). Later the user (SLn-1) having an access level of n-1 can access to the memory regions (MB1, MB2, . . . , MBn) illustrated in FIG. 2 by inputting the hash value (PWn-1) to the semiconductor device 100.

Referring back to FIGS. 4A and 4B, the hash value (PWn-1) outputted from the hash operator 400 is inputted to the hash operator 400. The hash operator 400 calculates the hash value (F(PWn-1)) 408. A hash value (PWn-2) outputted from the hash operator 400 is provided to a user (SLn-2) having an access level of n-2 as a password. The user (SLn-2) having an access level of n-2 can access to the memory regions (MB1, MB2, . . . , MBn) illustrated in FIG. 2 by inputting the hash value (PWn-2) to the semiconductor device 100.

The hash values (PW1, PW2, . . . , PWn-1) are calculated by the method like that and each of the calculated hash values (PW1, PW2, . . . , PWn-1) is provided to the users (SL1, SL2, . . . , SLn-1) as a password. That is, only the user (SLn) having the highest access level (n) can set up an arbitrary password (PWn) and the rest users (SL1, SL2, . . . , SLn-1) have to use the given hash value (PW1, PW2, . . . , PWn-1) as a password. The hash value (F(PWn-1)) that is, the hash value (HV) calculated from the hash operator 400 is stored in the fuse 310.

Figure 5:
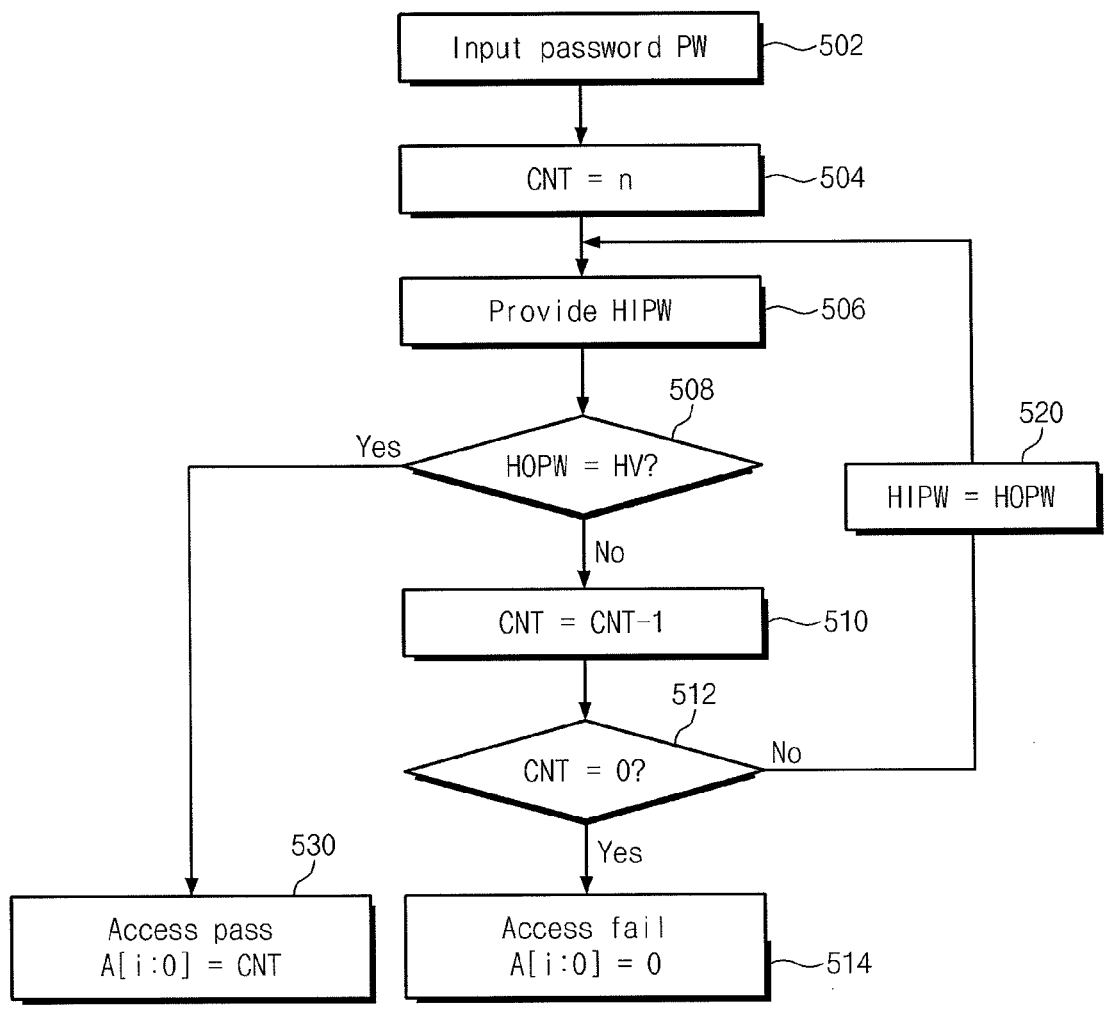
FIG. 5 is a flow chart illustrating a sequence of an access control operation of the semiconductor device illustrated in FIG. 3, in accordance with an embodiment of the present inventive concept.

FIG. 5 is a flow chart illustrating a sequence of an access control operation of the semiconductor device 100 illustrated in FIG. 3.

As described in connection with FIG. 3, if the detection signal (DET) outputted from the JTAG detector 340 is activated to a high level and the soft lock signal (SLOCK) outputted from the fuse 310 is a high level, the secure JTAG controller 320 receives a password (PW) from the outside (502). The secure JTAG controller 320 includes a counter. A count value of the counter is initially set to be n. The secure JTAG controller 320 provides the inputted password (PW) as an input (HIPW) of the hash operator 330 (506). The hash operator 330 performs a hash operation (F(PW)) on the input (HIPW) and outputs the hash value (HOPW).

The secure JTAG controller 320 compares the hash value (HV) stored in the fuse 310 with the hash value (HOPW) outputted from the hash operator 330 (508). If the hash value (HV) stored in the fuse 310 and the hash value (HOPW) outputted from the hash operator 330 coincide, the secure JTAG controller 320 outputs a count value (CNT) as an access level signal (AL[I:0]) (530). The access controller 350 outputs control signals (C0~Cj) corresponding to the access level signal (AL[I:0]).

If the hash value (HV) stored in the fuse 310 and the hash value (HOPW) outputted from the hash operator 330 do not coincide, the secure JTAG controller 320 reduces the count value (CNT) by 1 (510). The secure JTAG controller 320 determines whether the count value (CNT) is 0 (512). If the count value (CNT) is not 0, the secure JTAG controller 320 sets the hash value (HOPW) outputted from the hash operator 330 as an input (HIPW) of the hash operator 330 (520). The secure JTAG controller 320 provides the hash value (HIPW) to the hash operator 330 as an input (506). The secure JTAG controller 320 controls the hash operator 330 so that the hash operator 330 repeatedly performs a hash operation until the hash value (HV) stored in the fuse 310 and the hash value (HOPW) outputted from the hash operator 330 coincide or the count value (CNT) becomes 0. If the hash value (HV) stored in the fuse 310 and the hash value (HOPW) outputted from the hash operator 330 do not coincide until the count value becomes 0, the inputted password is considered not to have access authority to the memory 130. At this time, the secure JTAG controller 320 sets up all the bits of the access level signal (AL[i:0]) at 0 (514).

FIG. 6 is a drawing illustrating control signals outputted from an access controller illustrated in FIG. 3 by example according to an access level of a user.

In an example illustrated in FIG. 6, an access level is from 0 to 4. A user having an access level 0 is prohibited to access to the memory 130. The user having an access level 0 is a user to whom a password is not given or a user who fails a password certification because a hash value with respect to the inputted password and the hash value (HV) stored in the fuse 310 do not coincide while inputting a password the predetermined number of times. A user (SL1) having access level 1 can access only the memory region which is allowed access by a control signal (C3), and a user (SL2) having access level 2 can access the memory regions which are allowed access by control signals (C1, C3). A user (SL3) having access level 3 can access the memory regions which are allowed access by control signals (C1, C2, C3). A user (SL4) having access level 4 can access all the memory regions.

The user (SL4) having access level 4 may be a manufacturer of the semiconductor device 100. The user (SL4) sets up an arbitrary password (PW) and calculates a hash value (HV) with respect to the password which is set up using the hash operator illustrated in FIG. 4A to store the hash value (HV) in the fuse 310 in advance. At this time, hash values (i.e., passwords (PW3, PW2, PW1)) to be provided to users (SL3, SL2, SL1) are sequentially calculated by the method illustrated in FIG. 4B.

The password (PW3) provided to the user (SL3) is the hash value obtained by operating the password (PW4) set by the user (SL4) having the highest access level 4 one time. The password (PW2) provided to the user (SL2) is the hash value obtained by operating the password (PW4) two times and the password (PW1) provided to the user (SL1) is the hash value obtained by operating the password (PW4) three times. The hash value (HV) is obtained by operating the password (PW4) four times.

The users (SL1, SL2, SL3, SL4) have to input the password provided to each user to access to the memory 130 inside the semiconductor device 100 into the JTAG interface 110.

For example, when a password (PW) inputted in the secure JTAG controller 320 is the password (PW3) provided to the user (SL3), a hash value obtained through three times hash operations in the hash operator 330 with respect to the inputted password coincides with the hash value (HV) stored in the fuse 310. Therefore, if the count value (CNT) is 3 when the hash value (HOPW) outputted from the hash operator 330 coincides with the hash value stored in the fuse 310, an access level is 3 and an access level signal (AL[i:0]) is outputted as '0011'.

A hash value is a code made by a hash function result. A hash function outputs a hash value having a uniform length regardless of a length of an input value. The hash function generates different hash values from different input values. Since the hash function is one-way function, an input of the hash function cannot be inferred by a hash value. Thus, a user having a low access level cannot infer a password given to a user having a high access level with a password (i.e., a hash value) given to oneself.

The present inventive concept operates a hash operation repeatedly n times with respect to a password (PWn) set by a user (SLn) having the highest access level. Middle hash values (PWn-1, PWn-2, . . . , PW1) are provided as passwords of users having a low access level and only a hash value (HV=PW0) finally obtained is stored in the fuse 310. The present inventive concept stores only one hash value (IV) in the fuse 310 while giving different passwords to many users. Since the passwords given to many users do not have to be stored in the fuse 310, a size of the fuse 310 can be minimized. Moreover, since a hash value which is not a password is stored in the fuse 310, a user having a low access level can not infer a password of a user having a high access level. Thus, security of the semiconductor device 100 can be improved. Also, although a hash value stored in the fuse 310 is disclosed by a hacker not allowed to access, passwords given to users can be protected.

In this embodiment, it is described by example that the memory is divided into a plurality of memory regions and an access authority over each of the memory regions is provided to many users but an access to not only a memory but also an inner circuit included in a semiconductor device may be limited. It may be designed so that an execution of specific application programs stored in the memory 130 is limited according to an access level. Also, a partial limitation may be possible that the memory 130 is divided into a plurality of memory regions and a specific user is allowed to only read data but is not allowed to write data.

According to the present inventive concept, an access with respect to a semiconductor device may be limited in multi-level according to a user. In particular, since an access of a semiconductor device can be limited according to a password inputted through a communication interface such as JTAG, a security and a stability of a semiconductor device are improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling access to an inner circuit in an interface circuit of a semiconductor device which includes the interface circuit and the inner circuit, the method comprising:
    providing an inputted password as an input of a hash operator;
    performing a hash operation in the hash operator and outputting a first hash value;
    controlling the hash operator so that the hash operation is repeatedly performed in the hash operator by providing the first hash value as an input of the hash operator when the first hash value and a second hash value stored in a nonvolatile memory do not coincide, wherein the second hash value is initially determined using a predetermined password as an input to the hash operator and is then rehashed by the hash operator a predetermined number of times; and
    setting an access level with respect to the inner circuit according to the repetition number of times of the hash operation of the hash operator when the first and second hash values coincide,
    wherein setting an access level sets the access level with respect to the inner circuit at a highest level if the repetition number of times of the hash operation of the hash operator is n when the first and second hash values coincide and sets the access level with respect to the inner circuit at a level corresponding to K if the repetition number of times of the hash operation of the hash operator is k (k is a positive integer smaller than n) when the first and second hash values coincide,
    wherein the inner circuit comprises a memory including a plurality of memory regions and wherein setting an access level comprises setting a region which can be accessed among the plurality of memory regions of the memory according to the number of times of the hash operation of the hash operator when the first and second hash values coincide, and
    wherein the access level with respect to the inner circuit comprises a phased plurality of access levels and a high access level can access a memory region which can be accessed by a low access level.

2. The method as set forth in claim 1, further comprising, if the first and second hash values do not coincide while the hash operator repeatedly performs the hash operation the predetermined number of n times, prohibiting access to the inner circuit.

3. The method as set forth in claim 1, wherein the nonvolatile memory storing the second hash value is an E-fuse memory.

4. The method as set forth in claim 1, wherein the interface circuit comprises a joint test action group (JTAG) interface.

5. A semiconductor device comprising:
   an inner circuit;
   a hash operator performing a hash operation with respect to an input and outputting a first hash value; and
   a secure controller providing passwords inputted from the outside as an input of the hash operator and setting an access level with respect to the inner circuit according to a repetition number of times of the hash operation when a first hash value outputted from the hash operator and the second hash value stored in the nonvolatile memory coincide, wherein the second hash value is initially determined using a predetermined password as an input to the hash operator and is then rehashed by the hash operator a predetermined number of times,
   wherein the secure controller controls the hash operator so that the hash operation is repeatedly performed in the hash operator by providing the first hash value as an input of the hash operator when the first and second hash values coincide,
   wherein the secure controller provides the first hash value outputted from the hash operator as an input of the hash operator repeatedly a maximum number of n (n is a positive integer) times, sets an access level with respect to the inner circuit at a highest access level if the repetition number of times of the hash operation of the hash operator is n when the first and second hash values coincide, and sets an access level with respect to the inner circuit at a level corresponding to k if the repetition number of times of the hash operation of the hash operator is k (k is a positive integer smaller than n) when the first and second hash values coincide,
   wherein the inner circuit comprises a memory including a plurality of memory regions and wherein setting an access level comprises setting a region which can be accessed among the plurality of memory regions of the memory according to the number of times of the hash operation of the hash operator when the first and second hash values coincide, and
   wherein the access level with respect to the inner circuit comprises a phased plurality of access levels and a high access level can access a memory region which can be accessed by a low access level.

6. The semiconductor device of claim 5, wherein the second hash value stored in the nonvolatile memory is a hash value obtained by performing a hash operation on a password set by a user having the highest access level repeatedly the number of n times.

7. A method of controlling access in an interface circuit of a semiconductor device which includes the interface circuit, the method comprising:
   providing an inputted password as an input of a hash operator;
   performing a hash operation in the hash operator and outputting a first hash value;
   controlling the hash operator so that the hash operation is repeatedly performed in the hash operator by providing the first hash value as an input of the hash operator when the first hash value and a second hash value stored in a nonvolatile memory do not coincide, wherein the second hash value is initially determined using a predetermined password as an input to the hash operator and is then rehashed by the hash operator a predetermined number of times; and
   setting an access level according to the repetition number of times of the hash operation of the hash operator when the first and second hash values coincide,
   wherein setting an access level sets the access level at a highest level if the repetition number of times of the hash operation of the hash operator is n when the first and second hash values coincide and sets the access level at a level corresponding to k if the repetition number of times of the hash operation of the hash operator is k (k is a positive integer smaller than n) when the first and second hash values coincide,
   wherein the semiconductor device comprises a memory including a plurality of memory regions and wherein setting an access level comprises setting a region which can be accessed among the plurality of memory regions of the memory according to the number of times of the hash operation of the hash operator when the first and second hash values coincide, and
   wherein the access level comprises a phased plurality of access levels and a high access level can access a memory region which can be accessed by a low access level.

8. The method as set forth in claim 7, further comprising, if the first and second hash values do not coincide while the hash operator repeatedly performs the hash operation the predetermined number of n times, prohibiting access.

9. The method as set forth in claim 7, wherein the nonvolatile memory storing the second hash value is an E-fuse memory.

10. The method as set forth in claim 7, wherein the interface circuit comprises a joint test action group (JTAG) interface.

* * * * *